United States Patent [19]

Komatsu et al.

[11] Patent Number: 4,807,123
[45] Date of Patent: Feb. 21, 1989

[54] PROGRAMMABLE SYSTEM FOR INPUTTING & PROCESSING DATA USING VISUALLY PERCEPTIBLE DATA ENTRY FRAMES

[75] Inventors: Junichi Komatsu, Nara; Toshiaki Fujikawa, Higashiosaka; Koji Mizuno, Nara, all of Japan

[73] Assignee: Sharp Kabushiki Kaisha, Osaka, Japan

[21] Appl. No.: 312,899

[22] Filed: Oct. 19, 1981

[30] Foreign Application Priority Data

Oct. 20, 1980 [JP] Japan .................................. 55-147358

[51] Int. Cl.[4] .......................... G06F 3/14; G06F 3/153; G06F 3/023; G06F 15/21
[52] U.S. Cl. .................................. 364/200; 364/406; 340/721
[58] Field of Search ... 364/200 MS File, 900 MS File, 364/406; 340/721

[56] References Cited

U.S. PATENT DOCUMENTS

| | | | |
|---|---|---|---|
| 3,520,994 | 7/1970 | McAfee | 340/721 |
| 4,194,349 | 3/1980 | Lane | 57/265 |
| 4,204,253 | 5/1980 | Van Den Hanenberg et al. | 364/200 |
| 4,247,843 | 1/1981 | Miller et al. | 340/27 NA |
| 4,385,841 | 5/1983 | Kramer | 368/29 |
| 4,418,262 | 11/1983 | Noda | 219/10.55 B |

FOREIGN PATENT DOCUMENTS 2030827  10/1980  United Kingdom ............... 340/721

Primary Examiner—Archie E. Williams, Jr.
Attorney, Agent, or Firm—Birch, Stewart, Kolasch & Birch

[57] ABSTRACT

A small-sized office computer includes a cathode ray tube displaying a plurality of desired ruled line frames and desired characters or other information on the display during execution of business processes. The screen information is stored on a recording medium such as a floppy disc. Means are provided for specifying parameters in response to introduction of information into respective ruled line frames and programs are prepared using the parameters. The screen information is read and displayed through execution of said programs.

4 Claims, 10 Drawing Sheets

FIG. 11

| CODE | CUSTOMERS' NAME | DATE | SLIP NO |
|---|---|---|---|
| 001 | △☐ ELECTRIC CO. | 80.8.26 | 0001 |

\* \* SALES SLIP \* \*

| CODE | GOODS | QNT | @ | AMOUNT |
|---|---|---|---|---|
| 1 | 7 | 10 | 4,500 | 45,000 |
| 2 | | 2 | 120,000 | 240,000 |
| | | | | |
| | | | | |
| | | | | 285,000 |

PROGRAMMABLE SYSTEM FOR INPUTTING & PROCESSING DATA USING VISUALLY PERCEPTIBLE DATA ENTRY FRAMES

BACKGROUND OF THE INVENTION

This invention relates to an electronic computer which executes desired computations and performs billing or the like simply by defining and introducing desired entries via an input unit such as a keyboard.

With a conventional office computer, a different program is drawn up for each kind of business process and executed for the purpose of performing its subject process. When a number of varied business processes should be executed, the corresponding number of programs is stored in a memory. Drawing up of those programs is time- and labor-consuming and demands an increased capacity of the memory.

OBJECT AND SUMMARY OF THE INVENTION

Accordingly, it is an object of the present invention to provide an improvement in the design and architecture of an office type computer which provides simplicity of execution of business process by defining and introducing desired entries via an input unit such as a keyboard for the drawing up or preparation of programs executing those business processes and permitting the definition of the entries so introduced to be visually displayed on a screen.

Pursuant to the teachings of the present invention, the above discussed problem is overcome by provision of an office computer which comprises means for displaying a plurality of desired ruled line frames and desired characters or other information on a screen during execution of business processes and means for storing the screen information on a recording medium, means for specifying parameters in response to introduction of entry information in positions corresponding to the respective ones of the ruled lines frames, means for defining programs with the use of said parameters, means for executing said programs, and means for reading and displaying said screen information through execution of said programs.

BRIEF DESCRIPTION OF THE DRAWINGS

For a more complete understanding of the present invention and for further objects and advantages thereof, reference is now made to the following description taken in conjunction with the accompanying drawings, in which:

FIG. 11 is a view of the cathode ray tube screen when a desired one of the business processes is completed.

DETAILED DESCRIPTION OF THE INVENTION

Figure 1:
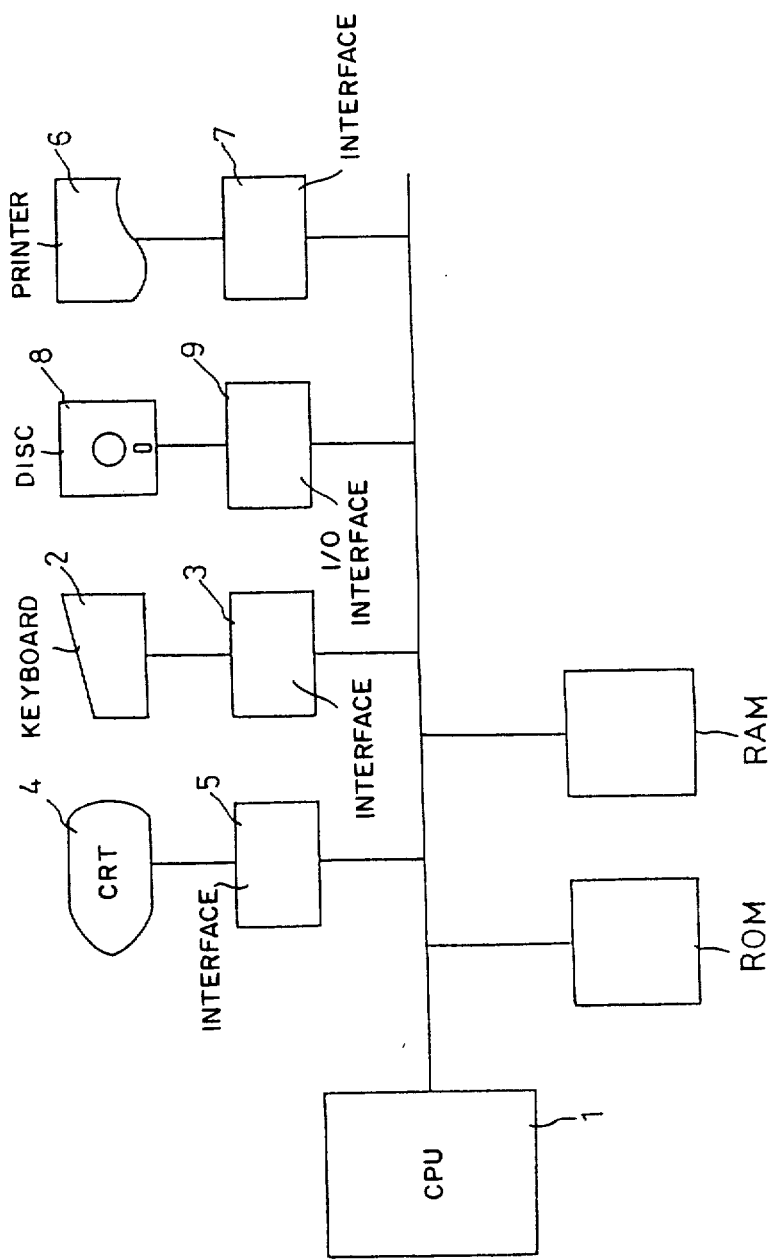
FIG. 1 is a block diagram of an office computer according to the present invention.

Referring now to FIG. 1, there is illustrated a block diagram of a typical office computer embodying the present invention, which computer comprises a keyboard (2) as an input unit for a central processing unit (1) and connected thereto via an interface (3), a cathode ray tube (4) and a printer (6) as an output unit connected via output interfaces (5) and (7) to the central processing unit (1), and a floppy disc unit (8) as a memory medium connected to the central processing unit via an input/output interface (9). There is further provided (ROM) and (RAM) for storing programs and data necessary for execution of programs by the central processing unit (1).

Figure 2:
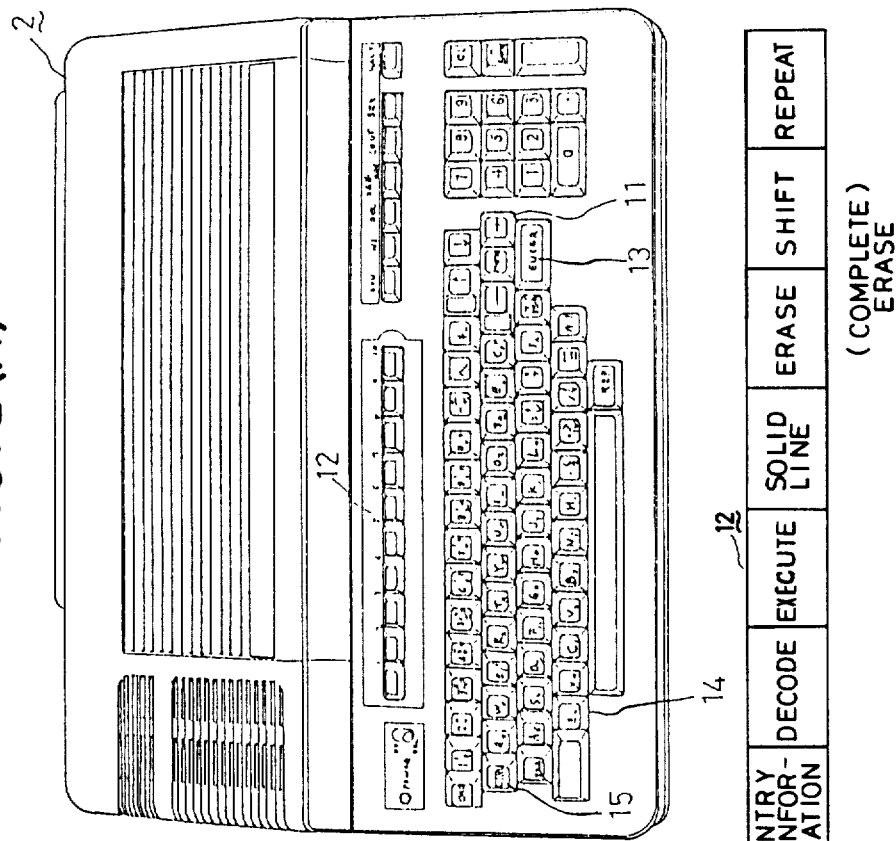
FIG. 2(a) is a perspective view of a keyboard.
FIG. 2(b) is an enlarged plan view of an array of keys forming a portion of the keyboard of FIG. 2.
Figure 4:
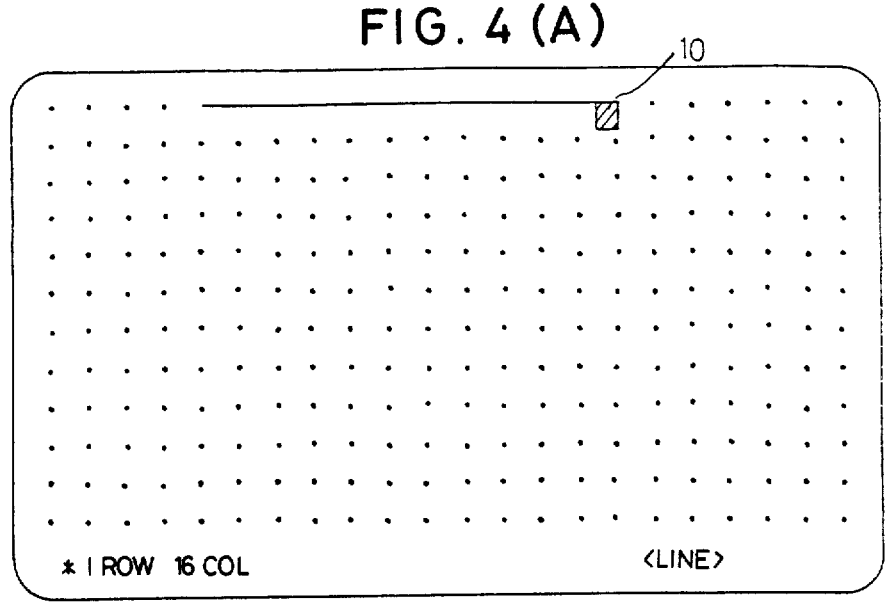
FIG. 4(a) is a view of a cathode ray tube screen during the drawing up of ruled lines.
FIG. 4(b) is a view of the cathode ray tube screen when the drawing up of the ruled lines is completed.
Figure 4:
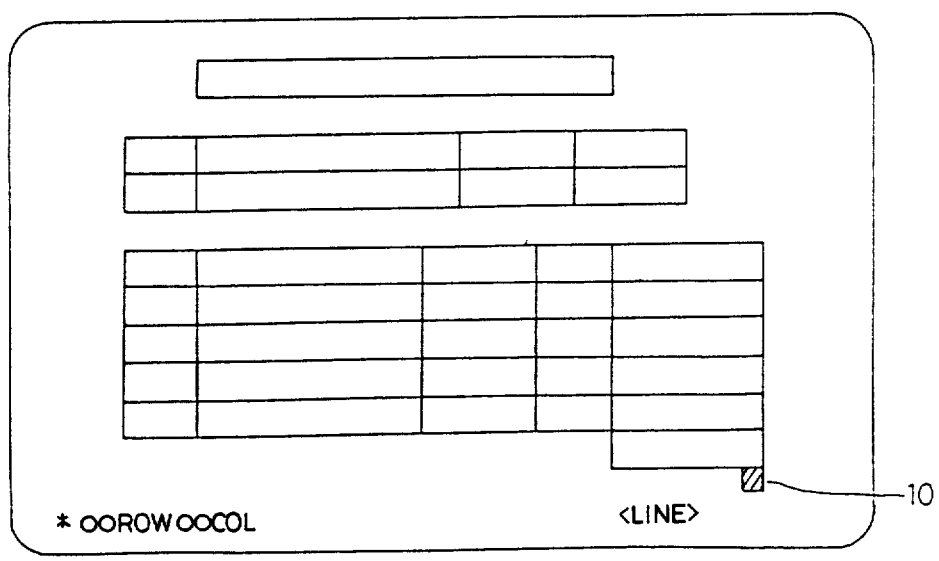

FIG. 2(a) is a perspective view of the appearance of the keyboard (2) which includes cursor shift keys (11) for moving a cursor (10) (shown in FIG. 4(a)) left or right and up or down on the cathode ray tube (4) or returning the cursor to its home position (e.g., the first row and first column position), a plurality of function keys (12), an ENTER key (13) for moving the cursor (10) to the next succeeding ruled line frame and alphanumeric keys (14) for introducing characters, numerals and symbols.

As best shown in FIG. 2(b), the function keys (12) typically include a ruled line key for selection of ruled lines, a heading key for selection of a mode by which headings are inputted, an entry item key for selection of a mode by which entry items are inputted, an entry information key for selection of a mode by which entry information is inputted, a decode key for selection of a mode by which programs are drawn up according to entries so inputted, an execute key for selection of a mode by which programs are executed, a solid line key for drawing a solid line at a cursor position, an erase key for selection of a mode by which the ruled lines are erased, a shift key for selection of a mode by which the cursor (10) is shifted, and a repeat key for selection of a mode by which the same inputs are repeatedly introduced.

The function keys (12) are double-function keys. For example, a print mode can be selected upon actuation of the ruled line key while a CNTRL key is being actuated and a complete erase mode can be selected for erasing the whole of a display on the cathode ray tube (4) upon actuation of the erase key while the CNTRL key (15) is being depressed. Furthermore, while the CNTRL key (15) is being depressed, actuation of the repeat key completes execution of the programs and selects an end mode wherein the ruled lines and the characters characteristic of headings.

The business processes are executed in the following manner with the electronic office computer described above. First of all, the ruled lines are drawn on the screen of the cathode ray tube (4) and a region defined by the ruled lines is sensed as to location and size. One or more headings for the entries is introduced within the region defined with the ruled lines and information relating to entry items is then introduced. Based upon these parameters so introduced, a program is prepared for execution of a business process desired to be executed. The contents of these entries are processed pursuant to the program prepared and the results of the processing are printed out. In the case where sequential entries are of the same type and differ only as to specific contents, the sequence of the procedure of preparing the program can be eliminated for the second and further business processes.

Figure 3:
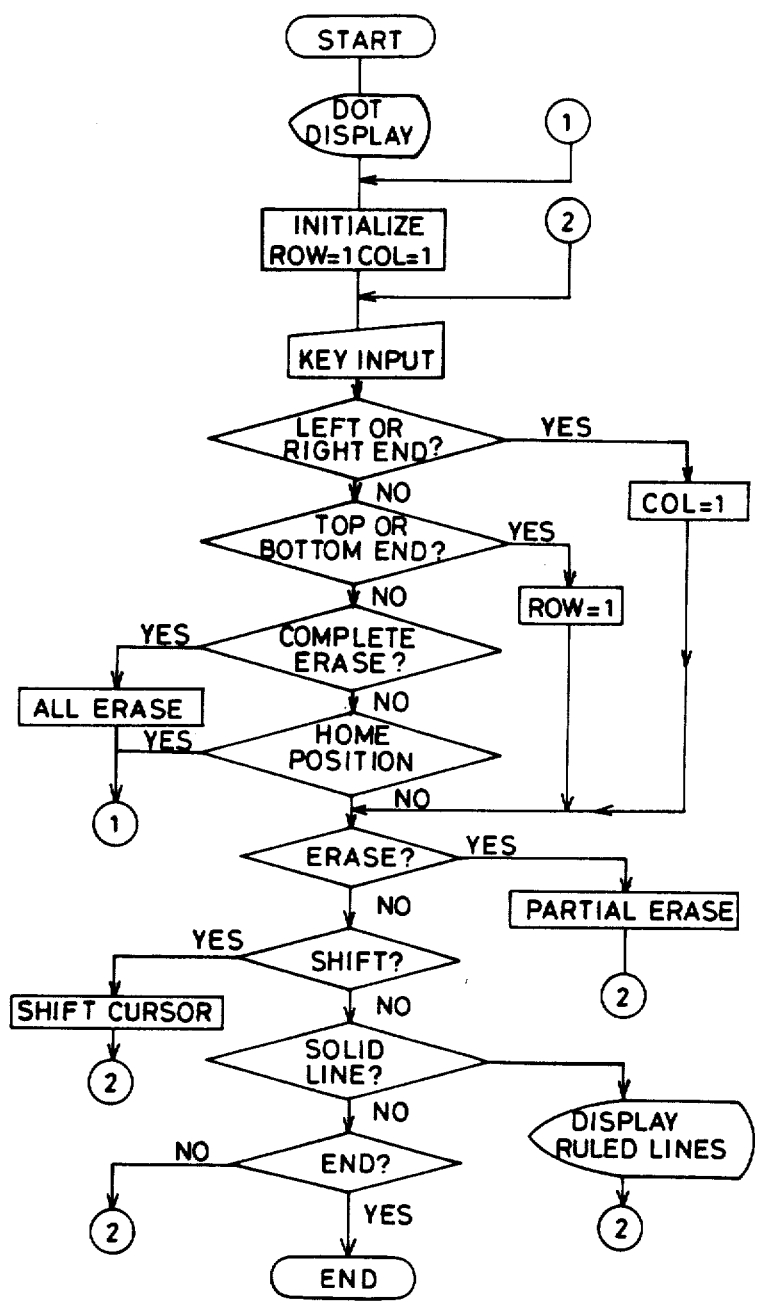
FIG. 3 is a flow chart showing the procedure for drawing up ruled lines.

Operation of the office computer will be further detailed. FIG. 3 is a flow chart illustrating the procedure for drawing the ruled lines on the cathode ray tube (4). A dot pattern is displayed throughout the screen of the cathode ray tube (4) upon actuation of the ruled line key. By setting both the lateral position (or row) and longitudinal position (or column) of the cursor (10) at "1", the cursor (10) is located at its home position (row="1" and column="1").

If any key input is present, then determination is made as to whether the cursor (10) should be moved to the left extreme or right extreme of the cathode ray tube (4), whether it should be shifted to the top extreme or bottom extreme of the cathode ray tube, whether it should be shifted up or down, whether the computer is in complete erase mode or whether the cursor should be in its home position. In the event that the answers to these interrogatories are all no, other determinations are made as to whether the erase has been actuated, whether the cursor shift key has been actuated, whether the solid line key has been actuated, or whether the computer is in end mode. If the answers are all no, the next key input is sensed.

When the key input is one that indicates the cursor (10) is to be moved toward the left extreme or right extreme of the cathode ray tube (4) or moved left or right, column="1" is inputted. When the cursor (10) on the cathode ray tube (4) is required to move further up or down or to its top extreme or bottom extreme, row="1" is inputted. Subsequently, decisions are made as to whether the erase key has been actuated, whether the cursor shift key has been actuated, whether the solid line key has been actuated or whether the computer is in end mode. The cursor (10) therefore stands at the left extreme or right extreme.

In the case where the key input is for selection of the complete erase mode, the screen of the cathode ray tube (4) is completely erased and the cursor (10) is moved to its home position. When the key input is for selection of the home position mode, the cursor (10) is returned to its home position. When the key input is from the erase key, the ruled line on the current cursor position is erased and the next coming input is sensed. If the next input comes from the cursor shift key, the cursor (10) is shifted in a desired one of four directions. When the input comes from the solid line key, the ruled line is drawn at the current cursor position and decision is made for the next coming input. When the key input pertains to the end mode, all of the operations are interrupted.

Subsequent to depression of the ruled line key, a cursor shift key (11) is actuated four times for right movement of the cursor (10) to the 5th column. After the solid line mode is selected upon actuation of the solid line key, it is possible to draw the ruled line extending from the 1st row and 5th column to the 1st row and 16th column as depicted in FIG. 4(a) by depressing the cursor shift key (11) eleven times or holding the same depressed for a period of time corresponding to the eleven actuations thereof. A display of "* row 1 and column 16" at the left bottom corner of the screen in FIG. 4(a) indicates the current cursor position, while "(LINE)" at the right bottom corner indicates the on-going operation for drawing the ruled line. Upon conducting a sequence of desired key inputs all of the necessary ruled lines are drawn to complete the buildup of the display framework as depicted in FIG. 4(b).

In the event that a wrong ruled line is drawn, all that is necessary to do is to depress the cursor shift key (11) and the erase key. The drawn ruled lines are stored in a ruled line storage region.

Figure 5:
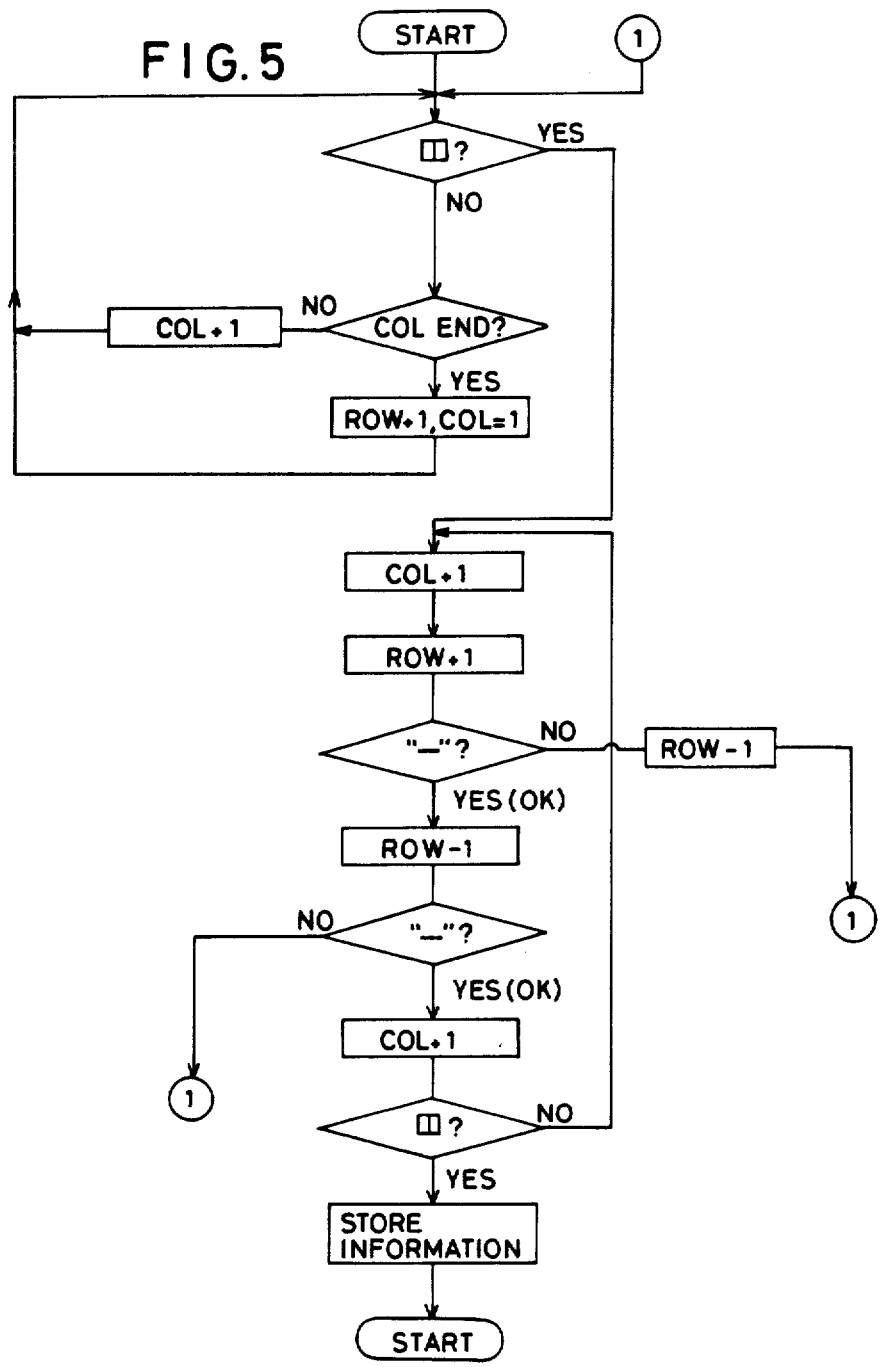
FIG. 5 is a flow chart showing the procedure for detecting the location and size of a ruled line frame.
Figures 6, 8:
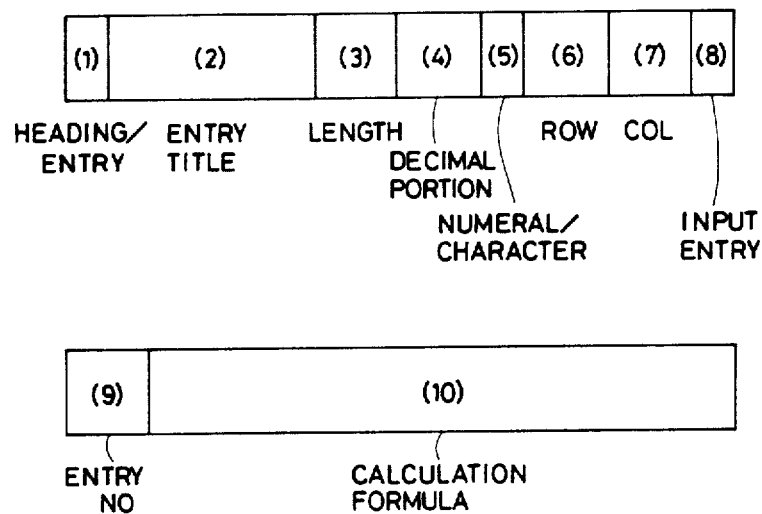
FIG. 6 is a view of the format of an entry information area.
FIG. 8 is a view of the cathode ray tube screen wherein the entry items are aligned within the ruled line frame.

FIG. 5 is a flow chart illustrating the procedure for entering into an entry information region, as shown in FIG. 6, information present within the region surrounded by the ruled lines and information characteristic of the location and size of the ruled line frame. This procedure is initiated immediately upon completion of the buildup of the display framework. In other words, the contents of the ruled line storage region corresponding to the home position are fetched and a decision is made as to whether these storage contents pertain to a longitudinal ruled line. If the answer is negative, then it is decided again whether a longitudinal ruled line is present on the same row but the next column. Unless any longitudinal ruled line is found at the last column, decision as to the presence or absence of the longitudinal ruled line is restarted with the first column of the second row.

If any longitudinal ruled line is found, then a decision as to the presence or absence of any lateral ruled line proceeds with the next row and next column. Decision is then effected on the next column of the same row. Should lateral ruled lines be present, decision as to the longitudinal ruled line proceeds with the next column of the same row. Unless any longitudinal ruled line is present, decision is made again as to the presence or absence of the longitudinal and lateral ruled lines. If any longitudinal ruled line is present, then it is possible to know the location and size of the rectangular ruled line frame as defined by these longitudinal and lateral ruled lines. This information characteristic of the location and size of the frame is stored in the entry information region and the computer seeks another ruled line frame.

The computer seeks a next ruled line frame. No ruled line frame is present unless a longitudinal ruled line is present or a lateral ruled line is present at least on the next column of the same row or on the next column of the next row. The location and size of the next ruled line frame are examined in a likewise manner.

FIG. 6 illustrates the entry information storage region which contains information characteristic of the location and size of the ruled line frame. For example, the storage region consists of a 1-bit heading flag area for indicating whether a heading has been inputted from the extreme left, an entry item area for introducing entry titles, a length area for indicating how long the ruled line frame is, a decimal area for storing the length of a decimal portion, a numeral/character flag area for indicating whether a numeral or a character is to be inputted, row and column position areas for indicating the location of the ruled line frame, an input entry area, an area-identifying number area for indicating what area is in use, and a calculation equation storing area. A heading is introduced within the ruled line frame and the corresponding information stored in the entry information area.

After the heading input mode is selected upon actuation of the heading key, the ruled line frame is located based upon the information stored in the row position area and the column position area. The cursor (10) appears within the ruled line frame and a heading such as "SALES SLIP" is inputted within the frame, typically at the highest row of FIG. 8. Upon subsequent actuation as shown in the ENTER key (13) the cursor (10) moves to the next ruled line frame to the right of the previous one. In the case where no ruled line frame is present on the right side of the ruled line frame bearing the heading, the cursor (10) moves to a lower ruled line frame. A heading flag is loaded into the heading flag area of the entry information area corresponding to the heading-bearing ruled line frame.

Other headings are introduced through repetition of the above described procedure. In the case of a ruled line frame having no heading, only the ENTER key (13) is depressed to reset the heading flag within the entry information area when the cursor (10) stands within the ruled line frame.

When introduction of all of the headings is completed, the CTRL key (15) and the repeat key are depressed to thereby complete introduction of the headings.

When this occurs, the ruled lines and the headings are stored in the floppy disc device (8). For example, the contents of the ruled line information storage area and the video RAM area are stored in the floppy disc device.

Figure 7:
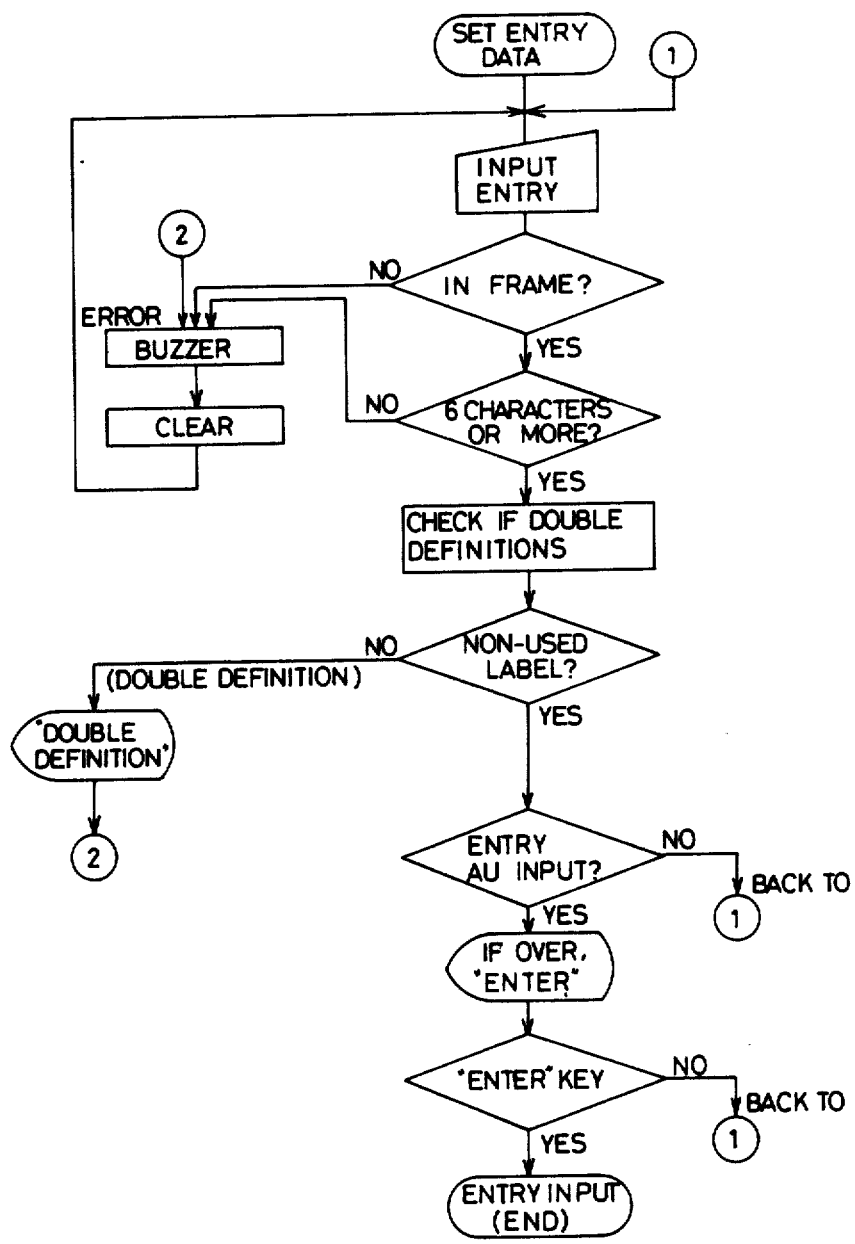
FIG. 7 is a flow chart showing the procedure for introducing entry items.

After the heading has been inputted, entry items are entered into the ruled line frame. FIG. 7 is a flow chart showing the procedure for introducing the entry items.

Upon actuation of the entry item key the entry item input mode is selected so that entry items may be inputted through actuation of desired ones of the character keys (14). Eventually, the cursor shift key or the ENTER key is actuated to complete the entry item input mode.

Decision is made as to whether the entry item introduced is within the ruled line frame, whether the entry item is 6 characters or less long, andwhether the entry item may have two definitions. As long as the entry item is six digits or less and within the ruled line frame and does not bear such two-fold definitions, the cursor (10) is moved to the following ruled line frame and the above procedure is repeated. If the entry item area is full of the entry information, it is decided whether the ENTER key is depressed and, if yes, the entry item input mode is over. If the decision results in the negative answer, then the above described procedure is repeated. The latter case will occur when it is desired to change the previous entry item after completion of the entry item input mode. In this case the input is erased upon actuation of the space key and the ENTER key and a correct input is then introduced.

If the entry item exceeds the ruled line frame or is seven or more digits long or has two definitions, such an alarm message as "ENTRY ITEM DOUBLE MEANINGS OR DEFINITION ERROR" is provided and followed by an alarm sound. Under these circumstances, the wrong entry is erased and the above procedure is repeated.

As is clear from FIG. 8, a desired entry item can be set wherever necessary within the ruled line frame through the above procedure.

Figure 9:
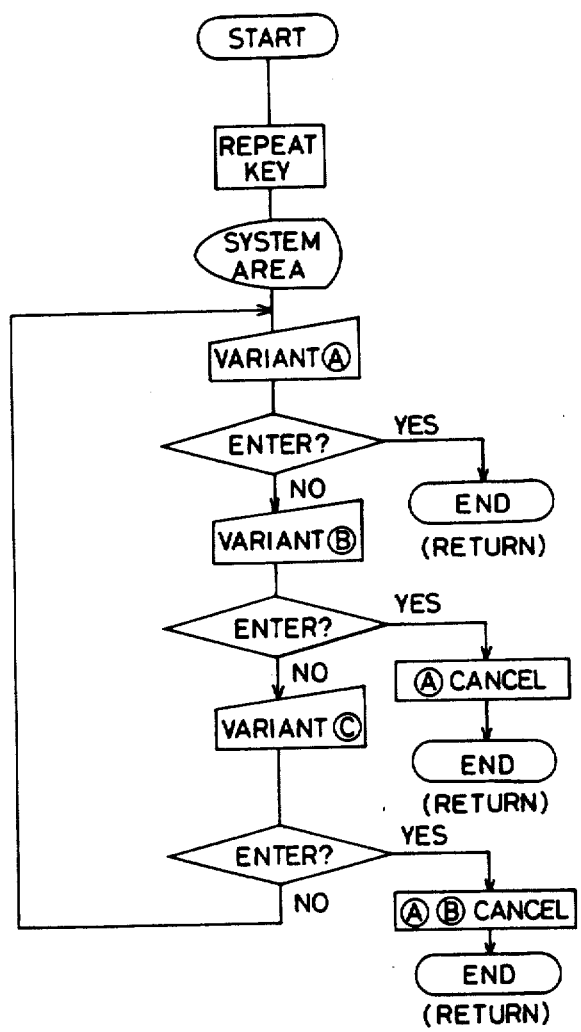
FIG. 9 is a flow chart showing the procedure for repeatedly introducing the same entry items.

It is to be noted that the entry item input procedure may be simplified as shown in the flow chart of FIG. 9, simplifying the operations required for repeating the above procedure and inputting all of the entry items especially when the same entry items (E, F, G, H, I etc,) should be inputted repeatedly as seen from FIG. 8. In other words, a message "REPEAT STEPS FROM (XXXX) TO (XXXX) (XXXX) TIMES" appears on a lower portion of the screen of the cathode ray tube (4) where (XXXX) is a variable already inputted. Assuming that E is codes, F is goods, G is quantity, H is unit price and I is sales amount, the respective entry items E, F, G, H and I are loaded into the entry item areas four times when "E" is introduced within the first parenthesis, "I" is inserted within the second and "4" is inserted within the third set of parentheses in the above-noted message.

It is mandatory to actuate the ENTER key after the respective variables are inputted. In the event that the ENTER key is actuated without any variable introduced, the above repeat procedure is terminated and the entry item input mode is restored.

Figure 10:
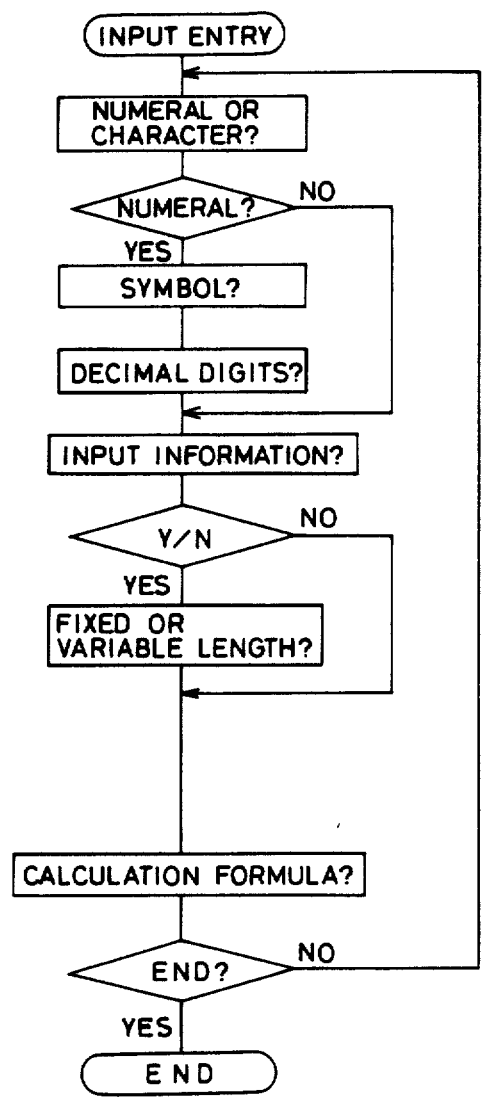
FIG. 10 is a flow chart showing the procedure for inputting entry information for respective entry items.

What follows is the procedure for inputting entry information for each of the respective entry items as detailed in a flow chart of FIG. 10.

When the entry information key is depressed for selection of the entry information input mode, an inquiry whether a character or a numeral is to be introduced is displayed on the screen. When the key indicating introduction of numerals is depressed, whether a symbol is present is decided and the digit length of the decimal portion is introduced. Then, whether any input to be introduced via the key or keys is present is displayed.

Furthermore, when the key indicating introduction of the characters is depressed, the display indicates whether any input should be introduced immediately via the key or keys. If the key is depressed in response to the affirmative answer, a signal is inputted, indicating whether information is to be processed as one of a fixed length or one of a variable length. If necessary, a calculation formula is inputted. On the contrary, when the key corresponding to the negative answer is depressed, a calculation formula can be inputted immediately.

Through execution of the above procedure all of the entry information necessary for the respective entry information area is inputted. This leads to completion of the entry information input mode.

A calculation formula is necessary as the entry information in the column with the heading of "amount" and as an entry at the right bottom ruled line frame bearing no heading as shown in FIG. 8. Within the entry with the heading "amount", "G * H" is input which indicates the product of quantity and unit price. "@I" is input as a calculation formula into the right bottom ruled line frame.

Based upon these parameters so introduced, the programs are made for execution of the business processes in the following manner.

Upon depression of the decode key the decode mode is selected which converts the respective entry items into matrix representations and converts the calculation formulas into matrix representations. In addition, the locations on the screen, the modes, the digit lengths, the matrix numbers, the line numbers are converted into data statements. The resultant programs are stored in the floppy disc device (8).

Upon subsequent actuation of the execute key the program is unloaded from the floppy disc device (8) into the central processing unit (1) and the screen information is loaded into the floppy disc device (4) as well as the ruled line information area of the video RAM. The result is that the ruled line frames and the headings are displayed as indicated in FIG. 8.

Thereafter, specific inputs in regard to codes, goods, quantity, etc. are inputted as shown in FIG. 11 so that the product of quantity and unit price (amount) is automatically displayed.

When introduction of all of the inputs is completed, the CTRL key (15) and the repeat key are depressed to calculate and display the total of amounts. Upon subsequent actuation of the CTRL key (15) and the ruled line key the contents of the cathode ray tube (8) are printed out by means of the printer (6).

Whereas in the above illustrated embodiment goods and unit price are inputted via the keys, code representations thereof can be introduced directly.

While only a certain embodiment of the present invention has been described, it will be apparent to those skilled in the art that various changes and modifications may be made therein without departing from the spirit and scope of the invention as claimed.

What is claimed is:

1. Input and programming means for a data processing device, said device comprising a display means, input decoding means, memory means, and data processing means, said input and programming means comprising:

input means comprising first means for inputting first data representing visually perceptible indicators for defining plural visually perceptible entry frames in said display means, wherein said display means is responsive to said input means for displaying said visually perceptible indicators and frames;

said input means comprising second means for entering second data in at least one of said entry frames, wherein said display means is responsive to said input means for displaying said second data within said at least one entry frame;

said input means comprising third means for entering third data representing operational instructions in at least one additional entry frame displayed on said display means, wherein said decoding means is responsive to said input means for decoding said third data and for storing said third data representing said instructions in said memory means;

wherein said data processing means comprises means responsive to said third data for performing a data processing operation on said second data for providing fourth data and said display means is responsive to said data processing means for displaying said fourth data in said at least one additional entry frame.

2. The input and programming means of claim 1, wherein said display means is responsive to said input means for displaying said third data in said at least one additional entry frame prior to displaying said fourth data therein.

3. The input and programming means of claim 1, wherein said indicators comprise lines defining said entry frames.

4. A method for inputting data and programming a data processing device comprising the steps of:

inputting first data for defining a plurality of visually perceptible entry frames and displaying said visually perceptible entry frames on a display means of the device;

inputting second data into at least one of said entry frames and displaying said second data in said at least one frame;

inputting third data representing operational instructions for the device into at least one additional frame;

decoding said third data for developing a data processing program;

processing said second data in accordance with said program for generating fourth data; and displaying said fourth data in said at least one additional frame.

* * * * *